Sept. 9, 1969    J. S. JOHNSTON    3,465,586
FLUID FLOW MEASURING APPARATUS
Filed July 18, 1967    2 Sheets-Sheet 1
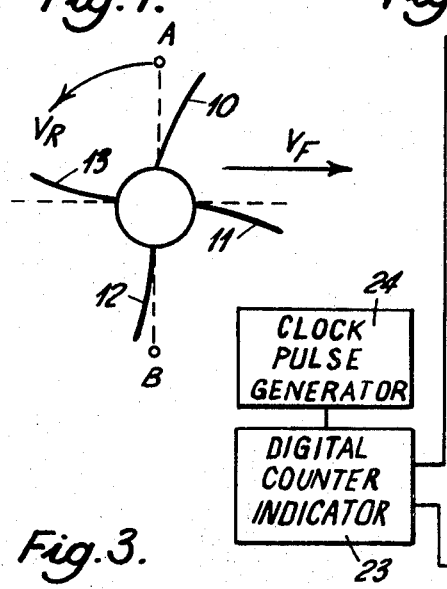
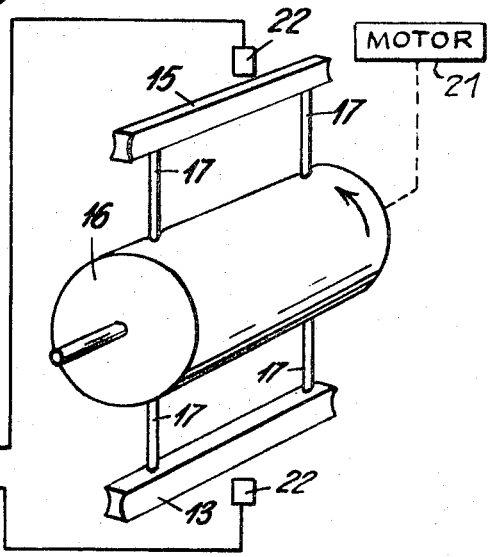
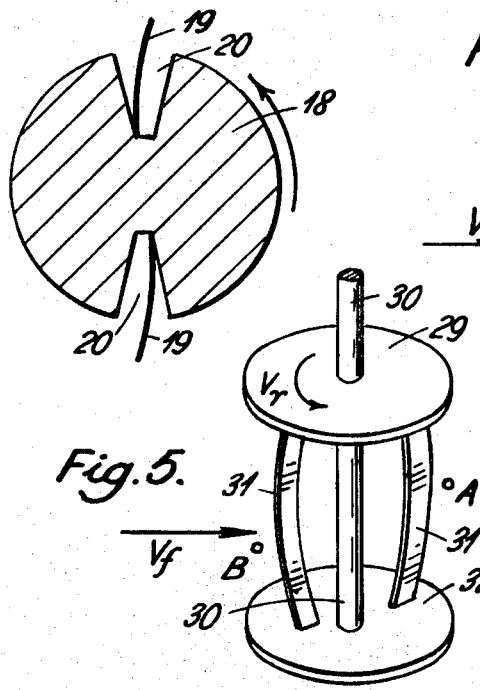
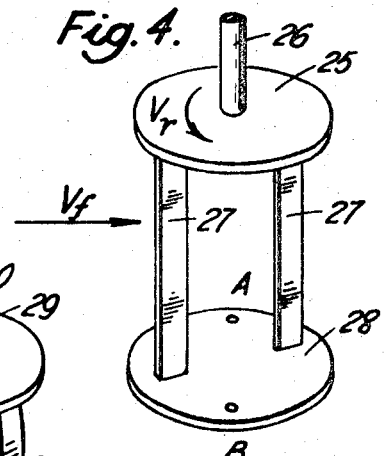
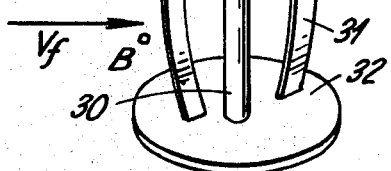

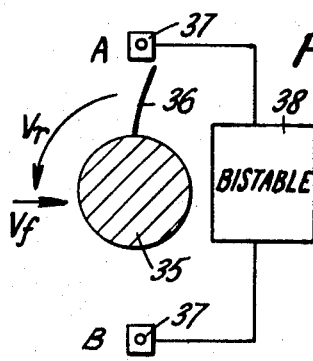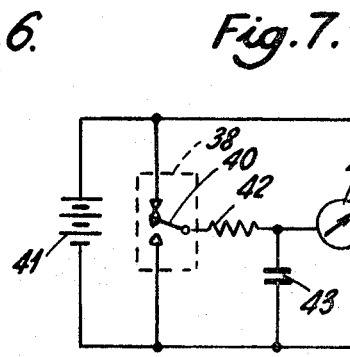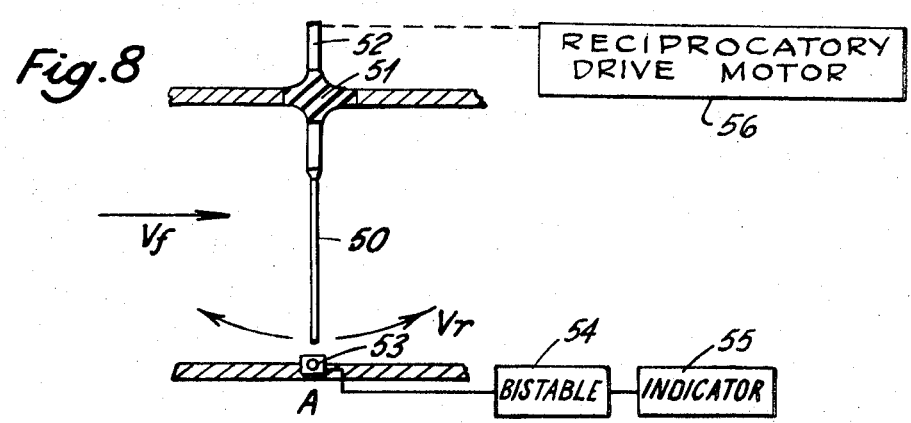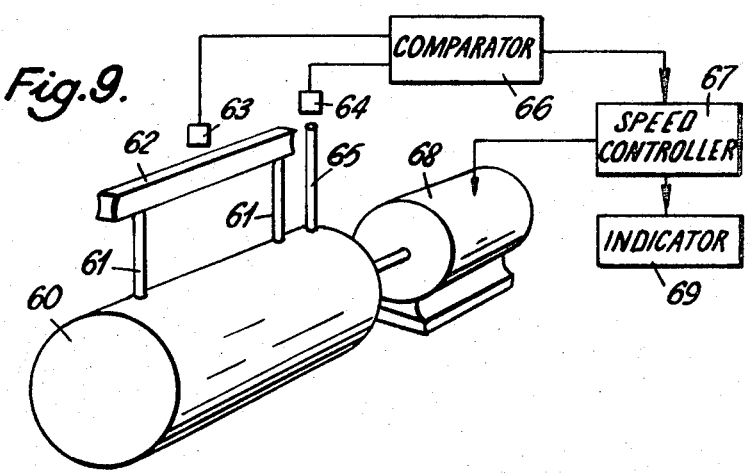

United States Patent Office 3,465,586
Patented Sept. 9, 1969

3,465,586
FLUID FLOW MEASURING APPARATUS
James Stewart Johnston, Bognor Regis, England, assignor to Rosemount Engineering Company Limited, Regis, England, a British company
Filed July 18, 1967, Ser. No. 654,253
Claims priority, application Great Britain, July 21, 1966, 32,794/66
Int. Cl. G01f 1/06
U.S. Cl. 73—228                                  18 Claims

ABSTRACT OF THE DISCLOSURE

A flow sensor comprises a rotatable or oscillatable carrier with at least one resilient or resiliently mounted blade and fixed means for sensing the passage of the blade. For mass flow measurement, the time difference in the passage of a blade upstream and downstream, due to deflection of the blade is a measure of mass flow. For fluid velocity measurement, the linear speed of movement of a blade may be controlled to give no deflection; the linear speed is then equal to the fluid velocity in the direction of movement of the blade.

---

This invention relates to fluid flow measuring apparatus and, according to this invention in its broadest aspect, such apparatus comprises at least one blade resiliently mounted on a drive member having drive means for moving the blade both upstream and downstream in the direction of flow to be measured and sensing means responsive to difference of deflections or time lag of the blade or blades for the two directions of motion. In one convenient form the apparatus comprises a paddle wheel with resilient or resiliently mounted blades, means for rotating the wheel with its axis normal to the direction of fluid flow to be measured and sensing means responsive to the deflection or time lag of the blades.

The invention is particularly applicable to the measurement of mass flow. For many purposes, it is required to measure mass flow as distinct from fluid velocity or dynamic head. If a simple paddle wheel with resilient blades is rotated in a stationary fluid, the reaction to motion on a blade moving through the fluid at a velocity $V_R$ is proportional to $\frac{1}{2}\rho V_R^2$ where $\rho$ is the density of the fluid. Thus the blades are deflected with a deflection force per unit area which increases radially outwardly. Viscous drags in the fluid would have a similar effect but, by making a blade of the appropriate shape, it is generally possible to make viscous forces negligible compared with the dynamic forces. If the fluid is flowing, the deflection of a blade moving against the fluid flow will be greater than the deflection of the same blade when it is moving with the fluid flow. Thus, considering two blades, which in their undeflected positions are diametrically opposite one another, if the fluid velocity is $V_F$, the force acting on the blade moving upstream is proportional to $$\tfrac{1}{2}\rho(V_R+V_F)^2$$

whilst the force on the blade moving downstream is $$\tfrac{1}{2}\rho(V_R-V_F)^2$$

Although reference has been made more particularly to a rotary paddle wheel, in some cases it may be preferred to use a blade which is oscillated either linearly or rotationally. If the blade is oscillated linearly, the linear velocity of movement of the blade past the sensing point corresponds to $V_R$ above and must be the same for the two directions of motion.

In the following description, reference will be made to the accompanying drawings in which:

FIGURE 1 is an explanatory diagram showing a paddle wheel with resilient blades;

FIGURES 2, 3, 4 and 5 are diagrams illustrating further forms of construction for paddles;

FIGURE 6 is a diagram for explaining a single blade system;

FIGURE 7 is a circuit diagram illustrating an electrical indicating device;

FIGURE 8 is a sectional view of an oscillatory mounted blade; and

FIGURE 9 is a diagram illustrating a fluid velocity measuring device.

Referring now to FIGURE 1, a paddle wheel with four resilient blades 10, 11, 12 and 13 rotating in a moving fluid, the blade 10 is deflected further from the position shown with a dashed line which it would occupy if there was no dynamic loading than is the blade 12. Consider now two sensing devices positioned at A and B, i.e., where the blades would instantaneously be if there was no dynamic loading; if these sensing devices produce pulses as the blades move past them, to a good approximation, the time interval between the pulses received from the two devices will be proportional to the difference in deflections of the two blades. This difference in deflection is approximately proportional to the difference between the forces acting in the two blades. The difference in deflection is thus proportional to $$\tfrac{1}{2}\rho[(V_R+V_F)^2-(V_R-V_F)^2]$$

i.e., $2\rho V_R V_F$.

The time interval between the pulses will be proportional to this difference in deflection divided by the circumferential velocity $V_R$. This time interval is thus proportional to $2\rho V_F$ and is independent of the rotation velocity $V_R$. The above analysis assumes that the rotational velocity $V_R$ is greater than the fluid velocity $V_F$; this is readily achieved in practice. It will be seen therefore that the time interval between the pulses is a direct measure of the mass flow irrespective of the rotational velocity provided the latter exceeds a certain minimum speed.

Thus, according to a further aspect of the invention, apparatus for measuring the mass flow of a fluid comprises a paddle wheel having at least one pair of blades normally diametrically opposite one another, the blades being resilient or resiliently mounted on a drive member, means for rotating the paddle wheel about an axis normal to the fluid flow and sensing means for determining the time difference between the passages of the two blades of a pair diametrically opposite one another past two fixed points located on diametrically opposite sides of the paddle wheel in a line normal to the direction of fluid flow to be measured.

As explained above, the time difference is a measure of the mass flow irrespective of the rotational speed provided this rotational speed is above a certain minimum value dependent on the maximum velocity of fluid to be measured. Thus it is immaterial if the drive motor for the wheel fluctuates in speed provided such fluctuations occur over periods long compared with the time differences to be measured.

The analysis given above is approximate in that it assumes small deflections. With larger deflections, some non-linearity and speed dependence will appear. In practice however, it is readily possible to achieve adequate sensitivity yet keep the deflections small.

If two pairs of sensing devices are arranged at diametrically orthogonal positions, the two components of mass flow may be separately determined; from them the direction and magnitude of the flow may be determined. Such a device may be used therefore as a velocity resolver. It may be used for example as a high speed resolving anemometer for meteorological work or for air velocity measurement on a craft, such as air cushion vehicles which normally move through the air with considerable side slip components.

However, generally the direction of the fluid flow will be known. Usually also the flow can be considered constant across a diameter of the wheel and any disturbances caused thereto by the rotor can be neglected. In this case, a single pair of sensing devices would be located at fixed positions along the diameter normal to the direction of flow.

A wide variety of sensing devices may be used for sensing the passage of the blades, for example, optical or capacitive or magnetic sensing devices may be employed.

The time interval determined by the sensing devices may readily be displayed digitally using a digital counter. Alternatively, it may be converted into an analogue voltage, for an analogue display or recording system.

A two-bladed rotor will provide two output pulse intervals per revolution using one pair of sensing devices. This number can be increased by increasing the number of blades and usually at least four blades would be employed. The number of blades can be increased provided each blade passing the measuring point is not in the wake of the preceding blade. However the blades can be staggered axially to avoid this if a high rate of output information is required.

FIGURE 2 is a perspective view of one form of construction suitable for the purpose. The blade consists of an elongated paddle member 15 of small dimensions in the radial direction, the member 15 being carried on a central spinner 16 by means of relatively thin flexural members 17 which are deflected by the force exerted on the relatively larger paddle. For simplicity of illustration only two paddles 15 are shown located diametrically opposite each other; as explained above a number may be spaced around the axis of the spinner 16. In FIGURE 2, the rotor assembly is driven by a constant speed motor 21. As previously explained, the actual speed of rotation is not important provided it does not fluctuate over short time intervals and provided the linear blade velocity is greater than the fluid velocity to be measured. Two sensors 22 are provided at diametrically opposite locations on a diameter normal to the dierction of flow to be measured and the time difference between the passage of blades 15 past the sensors 22 is measured by a digital counter and indicator 23 counting pulses from a clock pulse generator 24 to provide a direct digital indication of mass flow.

Another form of construction for this purpose is shown in FIGURE 3 which is a sectional elevation of a rotor assembly comprising a central body 18 with flexible blades 19 secured at the base of slots 20 so that the greater part of each blade is sheltered from the flow by the body 18. The rotor assembly of FIGURE 3 is driven at constant speed and can have an indicating system similar to that of FIGURE 2.

For an anemometer it is possible to use the cups similar to those employed on conventional anemometers, the cups however being carried on resilient arms. By varying the cross-sectional shape of the blades, it is possible to alter the effective position of the center of pressure and hence the particular value of rotational velocity which is significant for the purpose of measurement.

FIGURE 4 shows another form of paddle wheel comprising a disc 25 mounted on a shaft 26 for rotation about its axis. Two flexible paddle blades 27 extend from the disc 25 towards a fixed plate 28 which carries sensing elements at the points marked A and B. The direction of fluid flow is indicated by the arrow $V_F$. In FIGURE 5, a disc 29 on a shaft 30 carries two blades 31 as in FIGURE 4, but the lower ends of the blades 31 are fixed to a second disc 32 which is also secured to the shaft 30. In this case the deflection of the blades is sensed midway along their length by sensing elements at A and B. The rotor systems of FIGURES 4 and 5 can be used in the same way as the rotor of FIGURE 2.

In the examples more particularly described above, two or more paddle blades have been used and the deflection or time lag of the two blades at two points have been determined. It is possible, however, to use only a single blade; this has the advantage that there is no need to make the effective stiffness of two blades equal. With two blades of unequal stiffness, the time intervals can be averaged to eliminate the effect of the different stiffnesses. With a single blade, however, no such problem arises. Referring to FIGURE 6, there is shown diagrammatically a rotor 35 with a single resilient blade 36. Sensing means 37 are provided as before at diametrically opposite points A and B. If there is no fluid velocity, the deflected shape of the blade would be constant throughout its rotational path and the time taken to pass from A to B would be the same as that taken to pass from B to A. In the presence of a fluid flow of velocity $V_F$ in the direction indicated, the top of the blade will pass the point A later than it would otherwise have done and pass the point B earlier than it would have done. The sensing elements can be arranged to operate a two-state device 38 which is in one state while the blade passes from A to B and in the opposite state while the blade passes back from B to A. In the absence of fluid flow the mark-space ratio of this two-state device would be unity; for increasing values of $V_F$, the mark-space ratio will progressively depart from unity. FIGURE 7 is a diagram illustrating a simple form of indicating circuit for use with the single blade system of FIGURE 6. The two-state device 38 is shown as a switch 40 which connects one or other side of a direct voltage source 41 to a resistor 42 through which a capacitor 43 is charged or discharged according to the switch position. If the mark-space ratio is unity, then the smoothed D.C. voltage on the capacitor 43 will be half the input voltage from the source 41. An indicator 44, e.g., a galvanometer, compares the voltage on the capacitor with that at the top of a potentiometer formed by resistors 45, 46 connected across the supply source. If these resistors are equal, there is no deflection of the indicator when the mark-space ratio is unity, i.e., there is no fluid flow. If there is fluid flow the indicator 44 gives an indication representative of the magnitude and sense of the flow.

A single blade structure may use any of the constructions of paddle blades previously described.

A single blade may often conveniently be oscillated instead of continuously rotated. The oscillation may be through a circular arc but conveniently is linear. With linear oscillation, a single sensing point can be used, the two-state device being arranged to change state every time the blade passes it, going into one state as the blade is moving in one direction and going into the other state when the blade is moving in the opposite direction. The indicator of FIGURE 7 thus can be used for such an arrangement. With a blade which is oscillated, it is necessary that, apart from the effect of the fluid flow, the blade, when it passes the sensing point, should be moving at the same speed for both directions of movement. Subject to this, it is necessary only that the movement should be symmetrical and it is therefore relatively simple to provide a suitable oscillatory device. The indicating device of FIGURE 7 will operate in conjunction with an oscillatory blade in exactly the same way as for a rotating blade.

An oscillatory blade does not require a bearing for a rotating shaft in contact with the fluid. For example, FIGURE 8 illustrates a blade 50 movable past a sensing point A. The blade is supported by a flexible gland or wall section 51. The blade may be oscillated by a reciprocatory drive motor 56 acting on a projection 52 integral with but on the outer side of the gland or wall section 51. A sensor 53 at A is connected to a two-state device 54 to trigger it into opposite states for each passage of the blade past the sensor. This two-state device 54 controls an indicator 55 which may be similar to that described with reference to FIGURE 7.

In addition to or alternatively to measuring mass flow, the paddle may also be used for fluid velocity measurement. This may be done by using blades which are rotatably driven and have a limited length in the radial direction, so that the actual linear velocity of the blade at all points thereon can be considered to be uniform and by adjusting the speed of rotation of the blades until there is no deflection of a blade when it is moving in the direction of the fluid flow to be measured. If there is no deflection, there is no dynamic force on the blade and hence it must be moving at the same speed as the fluid. The fluid velocity is thus determined from measurement of the rotational speed at which no deflection of a blade occurs. The absence of deflection may be sensed by providing a sensing device on the wheel. Conveniently, however, rigid spokes are provided on the wheel as well as resilient or resiliently mounted blades and a fixed sensing device is provided to determine when there is no time interval between the passage of a rigid spoke and a blade past a fixed point.

For velocity measurement as described above, the blades must be effective at some predetermined radius from the centre of rotation so that it can be assumed that their linear speed is uniform.

Such a velocity measuring device is shown in FIGURE 9. In this figure, there is shown a rotor 60 with radial extending resilient arms 61 carrying an elongated paddle blade 62. This extends parallel to the axis of rotation and is of relatively small radial width so that the linear velocity of all parts of the blade can be considered uniform. A sensor 63 at a fixed point senses the passage of the blade 62 when it is moving in the direction of the fluid flow to be measured. Another sensor 64 senses the passage of a rigid radial spoke 65 on the rotor 60. Conveniently the spoke extends in the same radial direction as the arms 61 if there is no deflection of the blade so that, when there is no deflection, there is no time difference between the outputs from the two sensors. The actual time difference between the outputs of the two sensors is determined by a comparator 66 which feeds a control signal to a speed controller 67 for a controllable speed electric motor 68 driving the rotor. The control system is arranged so that the speed of the motor is adjusted to minimize the time difference of the outputs from the two sensors 63, 64. As previously explained, the linear speed of the blade 62 is then equal to fluid velocity; this speed is indicated on an indicator 69.

The multiblade mass flow sensor of FIGURES 1 to 5 can be arranged so that the rotor and blades form a pump and so enabling the mass flow through the pump to be measured.

I claim:

1. Fluid flow measuring apparatus comprising a drive member rotatable about an axis normal to the direction of flow to be measured, at least one blade resiliently mounted on said drive member, drive means operative on said drive member for moving the blade both upstream and downstream relative to the direction of the flow to be measured, sensing means responsive to difference of deflections of the blade with respect to the drive member for the motion upstream and the motion downstream, means to indicate said difference.

2. Fluid flow measuring apparatus as claimed in claim 1 wherein said blade is continuously rotated about an axis orthogonal to the direction of the fluid stream.

3. Fluid flow measuring apparatus as claimed in claim 2 wherein a second blade is resiliently mounted on the drive member diametrically opposite of the axis of rotation from said one blade and wherein the sensing means includes two fixed sensing devices on diametrically opposite sides of the axis of rotation for providing electrical outputs indicative of the time instants at which the blades pass the sensing devices.

4. Fluid flow measuring apparatus as claimed in claim 3 said indicating means comprising digital indicating means for indicating the time difference of passage of diametrically opposite blades past said sensing devices.

5. Apparatus as claimed in claim 1 wherein said drive member comprises a rotatable central carrier and wherein said blade is elongated parallel to the axis of rotation and of relatively small dimensions in the radial direction, said blade being carried on the carrier by relatively thin flexural members.

6. Apparatus as claimed in claim 1 wherein said drive member comprises a rotatable carrier and wherein said blade is an elongated blade extending outwardly from the carrier parallel to but displaced from the axis of rotation.

7. Apparatus as claimed in claim 1 wherein said drive member comprises a carrier continuously rotated at constant speed and wherein the sensing means includes first and second sensors provided at fixed points diametrically opposite one another and wherein said indicating means comprises means for indicating the difference in the time of travel of the blade from the first sensor to the second sensor and from the second sensor to the first sensor.

8. Apparatus as claimed in claim 1 wherein the sensing means includes a fixed sensor and the drive means includes means for oscillating said drive member so that said blade is oscillated to and fro past said fixed sensor.

9. Apparatus as claimed in claim 8 wherein said means for oscillating the drive member are arranged so that the oscillation, apart from the effect of the fluid flow, is symmetrical about the sensor, when it passes the sensor, moving at the same speed for both directions of motion.

10. Apparatus as claimed in claim 9 wherein said indicating means are provided for indicating the difference in time of the intervals between successive passages past the sensor.

11. Apparatus for measuring fluid velocity comprising a drive member, at least one blade resiliently mounted on said drive member, means for continuously rotating said drive member about an axis orthogonal to the direction of the fluid velocity to be measured, said blade having a limited length in the radial direction so that the actual linear velocity of the blade at all points thereon can be considered uniform, sensing means responsive to the deflection of the blade, means for adjusting the speed of rotation of the blade so that said sensing means indicates no deflection of a blade when the blade is at a point in the cycle of rotation such that the blade is moving in the direction of the fluid flow to be measured, and means for indicating the speed of rotation of the blade.

12. Apparatus as claimed in claim 11, a rigid spoke is mounted on said drive member, to rotate therewith, and extend outwardly therefrom, and the sensing means includes means for measuring a difference in the time, between the time the blade passes a fixed point and the time the rigid spoke passes a fixed point.

13. Apparatus for measuring the mass flow of a fluid comprising a paddle wheel, said paddle wheel including a drive member and at least one pair of blades resiliently mounted on said drive member, and being diametrically opposite each other when the drive member is at rest relative to said fluid, means for rotating the paddle wheel about an axis normal to the direction of fluid flow, sensing means for determining the difference between the times at which the blades of a pair pass two fixed points located on diametrically opposite sides of the paddle wheel on a line normal to the direction of fluid flow to be measured, and means to indicate said difference.

14. Apparatus for measuring the mass flow of a fluid comprising a paddle wheel having at least one pair of blades of resilient material mounted diametrically opposite one another, means for rotating said paddle wheel about an axis normal to the fluid flow, sensing means for determining the difference between the times at which points on the two blades of a pair pass two fixed points located on diametrically opposite sides of the paddle wheel in a line normal to the direction of fluid flow to be measured, and means to indicate said difference.

15. Fluid flow measuring apparatus comprising at least one resilient blade, drive means for rotating said blade about an axis normal to the direction of the fluid flow to be measured to move the blade both upstream and downstream relative to said direction, sensing means responsive to the difference between deflections of points on said blade which occur during the upstream and the downstream movement of the blade.

16. Fluid flow measuring apparatus comprising a drive member rotatable about an axis normal to the direction of flow to be measured, said drive member comprising a rotatable central carrier having a slot and a slot base in part defining said slot, a blade of a flexible material mounted on the drive member to extend outwardly from the base so that the greater part of the blade is sheltered from the flow by the carrier, drive means operative on said drive member for moving the blade both upstream and downstream in the direction of flow to be measured, sensing means responsive to the difference of deflections of the blade with respect to the drive member which occur during the motion upstream and the motion downstream, and means to indicate said difference.

17. Fluid flow measuring apparatus comprising a blade, resilient means mounting the blade for, in a datum position, extending generally normal to the direction of flow to be measured and for oscillatory movement both upstream and downstream in the direction of flow to be measured, drive means connected to the blade to oscillate the blade both upstream and downstream relative the direction of flow, means for sensing the difference between the time interval during which the blade is upstream relative to said datum position and the time interval during which the blade is downstream relative to said datum position, and means to indicate said difference.

18. The apparatus of claim 17 further characterized in that drive means comprises means for oscillating the blade to move the blade, apart from the effect of the fluid flow, symmetrical about the sensing means with the blade, when it passes the sensor, moving at the said speed for both directions of motion.

References Cited
UNITED STATES PATENTS

| | | |
|---|---|---|
| 2,934,951 | 5/1960 | Li. |
| 3,144,769 | 8/1964 | Francisco. |
| 3,199,347 | 8/1965 | Moss. |
| 3,292,433 | 12/1966 | Ichihara. |
| 3,306,105 | 2/1967 | Ichihara et al. |
| 3,331,244 | 7/1967 | Henderson. |

JAMES J. GILL, Primary Examiner

J. W. WHALEN, Assistant Examiner

U.S. Cl. X.R.

73—194, 229